F. C. COOK.
Apparatus for Destroying Insects by Fumigation.
No. 222,575. Patented Dec. 16, 1879.
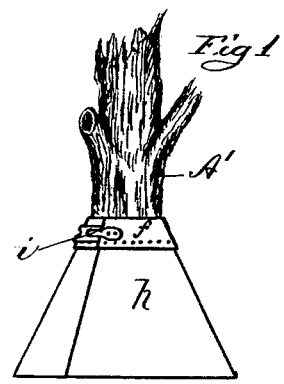
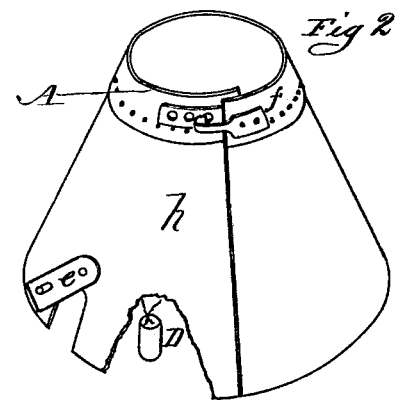

UNITED STATES PATENT OFFICE.

FRANCIS C. COOK, OF SPRINGFIELD, MASS., ASSIGNOR OF ONE-HALF OF HIS RIGHT TO HENRY M. POLLARD, OF PROVIDENCE, R. I.

IMPROVEMENT IN APPARATUS FOR DESTROYING INSECTS BY FUMIGATION.

Specification forming part of Letters Patent No. 222,575, dated December 16, 1879; application filed August 29, 1878.

*To all whom it may concern:*

Be it known that I, FRANCIS C. COOK, of Springfield, county of Hampden, and State of Massachusetts, have invented new and useful Apparatus for Destroying Insects in Trees by Fumigation, which improvements are fully set forth in the annexed specification and in the accompanying drawings.

The object of my invention is to provide new and efficient means for destroying by fumigation such borers and insects as penetrate and secrete themselves in the bark or in the body of the tree contiguous thereto; and it consists in a metallic fumigator of conic or cylindrical form, constructed so that one end thereof can be attached tightly around the trunk of a tree, while its opposite end sits closely upon the ground surrounding the tree, thereby forming a fumigating-chamber, in which is a door for the introduction of fumigating-matter around the trunk of the tree so inclosed.

The drawings consist of two figures, in which A', Figure 1, represents the trunk of a tree, around which is shown a fumigator, h, of inverted-funnel form, its upper end secured tightly to the trunk A', and its lower end resting upon the ground.

Fig. 2 is a view of the fumigator h detached from the trunk A', in which e is a door at its lower edge. f is an elastic band around its upper border, and through a cut-away part is shown a fumigating-cartridge, D, with a lighting-fuse inserted therein, said cartridge being charged with a gas or fume creating substance.

My manner of operating and applying the before-mentioned devices for killing destructive insects and borers which infest the lower portion of the trunks of trees is as follows, viz:

It is well known that great harm is done to fruit and ornamental trees if no measures are taken to destroy insects and borers, which, with each recurring season, attack and take refuge in the bark and wood thereof, and heretofore no adequate means have existed for effectually and quickly destroying such insects. But by the employment of my fumigator, which is preferably made of sheet metal securely attached around the base of a tree, and providing for the combustion within it of a cartridge or other suitable material for producing in it a gas or smoke which is a deadly poison to insects and worms, a long-sought object is attained, and said destructive insects are by this means quickly killed.

The fumigating-chamber formed by the walls surrounding the tree is not so large as to prevent the gas generated from the combustion of the cartridge being so dense and strong as to quickly penetrate the retreat of said insects and destroy them.

It will be observed that the fumigator h is provided with an elastic band, f, around its upper edge, and a hook, i, arranged so as to hook into holes on or near the band, and thus produce the requisite strain of the band around the tree to make it tight.

That portion of the fumigator between the band f and the ground may have its meeting-edges made tight in any convenient manner, and one would be to make one edge of double thickness, leaving a space at the edge sufficiently open to receive the opposite edge of the fumigator between the two said thicknesses, and some soft material that would make a tight joint, and around the whole may be secured a proper banding to firmly secure it.

We thus arrange the fumigator around the trunk of the tree A', insert the cartridge D through door e, light the fuse to the cartridge, and close the door. The fumes created by the burning of the said cartridge will penetrate into the retreat of all the insects in that portion of the tree inclosed by the fumigator, destroying them in whatever stage of transformation they may exist.

The fumigator may then be removed from the tree and the same operation be repeated upon others that may require it.

It is not essential to the object of my invention that such a cartridge as I describe and show should be employed to produce the said poisonous fumes, but the requisite substance for producing them may be burned in any other convenient manner.

What I claim as my invention is—

The metallic tree-fumigator $h$, having a door, $e$, in the side thereof, and an elastic band, $f$, and a hook attached to its upper end, whereby said fumigator may be secured to a tree with its lower end against the ground, to form a fumigating-chamber around the trunk thereof near its base, substantially as and for the purpose set forth.

FRANCIS C. COOK.

Witnesses:
H. A. CHAPIN,
FRED. A. CLARK.